(12) United States Patent
Chen

(10) Patent No.: US 12,443,246 B2
(45) Date of Patent: Oct. 14, 2025

(54) ELECTRONIC DEVICE

(71) Applicant: Advanced Semiconductor Engineering, Inc., Kaohsiung (TW)

(72) Inventor: Yi Chen, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 594 days.

(21) Appl. No.: 17/703,834

(22) Filed: Mar. 24, 2022

(65) Prior Publication Data

US 2023/0305605 A1 Sep. 28, 2023

(51) Int. Cl.
  *H04B 1/08* (2006.01)
  *G06F 1/16* (2006.01)
  *H04B 1/03* (2006.01)
  *H04M 1/02* (2006.01)

(52) U.S. Cl.
  CPC .......... *G06F 1/1698* (2013.01); *G06F 1/1681* (2013.01)

(58) Field of Classification Search
  CPC .... G06F 1/1652; G06F 1/1681; G06F 1/1683; G06F 1/1698; H01Q 3/02; H01Q 1/12; H01Q 1/22; H01Q 1/38; H04M 1/021; H04M 1/0214; H04M 1/0225; H04B 1/03; H04B 1/08
  USPC ........................................................ 455/557
  See application file for complete search history.

(56) References Cited

U.S. PATENT DOCUMENTS

| | | | | |
|---|---|---|---|---|
| 6,388,622 | B1* | 5/2002 | Jennetti | H01Q 21/065 343/872 |
| 10,290,919 | B2* | 5/2019 | Hsu | G06F 1/1618 |
| 10,749,612 | B1* | 8/2020 | Iannotti | F01D 21/003 |
| 11,122,512 | B2 | 9/2021 | Akkarakaran et al. | |
| 2011/0130102 | A1* | 6/2011 | Nishizono | H01Q 7/005 343/702 |
| 2017/0294701 | A1* | 10/2017 | Trogan | H02J 50/20 |
| 2021/0104582 | A1 | 4/2021 | Kim et al. | |
| 2021/0408747 | A1* | 12/2021 | Wang | H04M 1/0214 |
| 2022/0140469 | A1* | 5/2022 | An | H01Q 1/243 455/73 |
| 2022/0206543 | A1* | 6/2022 | Kim | G06F 1/1641 |
| 2022/0262747 | A1* | 8/2022 | Chiu | H01L 23/3121 |
| 2022/0359975 | A1* | 11/2022 | Lai | H01Q 9/285 |
| 2023/0126247 | A1* | 4/2023 | Yoon | G06F 1/1698 361/679.27 |
| 2024/0211006 | A1* | 6/2024 | Thakur | H01Q 3/06 |

FOREIGN PATENT DOCUMENTS

| | | |
|---|---|---|
| KR | 10-2021-0041156 A | 4/2021 |
| KR | 10-2021-0111050 A | 9/2021 |

* cited by examiner

*Primary Examiner* — Andrew Wendell
(74) *Attorney, Agent, or Firm* — FOLEY & LARDNER LLP

(57) ABSTRACT

An electronic device is disclosed. The electronic device includes a first part, a second part adjacent to the first part and a rotational shaft. The rotational shaft includes an antenna and configured to allow the first part and the second part to rotate about a rotation axis defined by the rotational shaft.

11 Claims, 24 Drawing Sheets

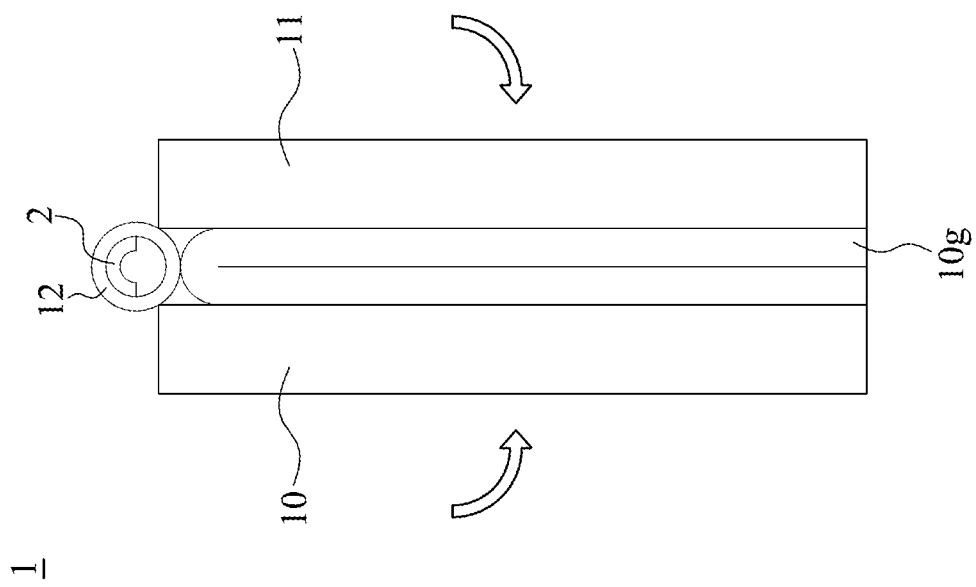

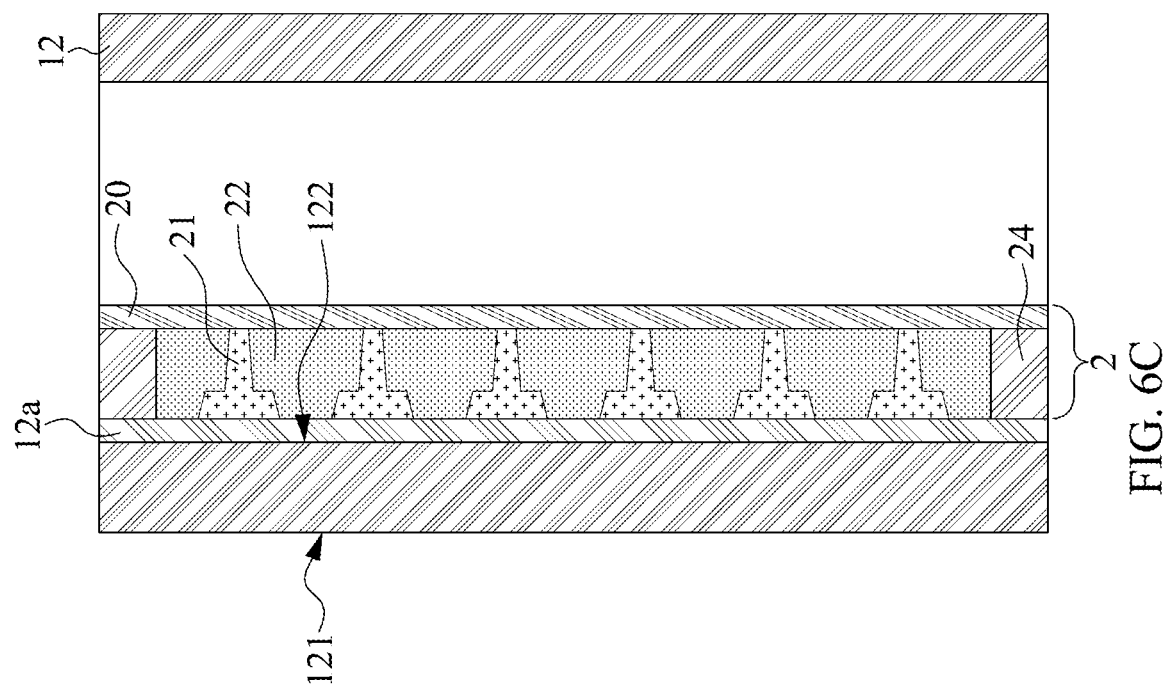

ELECTRONIC DEVICE

BACKGROUND

1. Field of the Disclosure

The present disclosure generally relates to an electronic device.

2. Description of the Related Art

To reduce the size and achieve a higher integration of semiconductor device packages, several packaging solutions, such as Antenna in Package (AiP) and Antenna on Package (AoP), have been developed and implemented.

However, to support the industry's demand for increased electronic functionality, the size and/or form factor of the semiconductor device packages will inevitably be increased, and some applications may be limited (e.g., in portable devices). In addition, as the display area in a portable device expands, the space for accommodating antennas and other components (such as a battery, a memory, a processor, etc.) decreases.

SUMMARY

In some embodiments, an electronic device includes a first part, a second part adjacent to the first part and a rotational shaft. The rotational shaft includes an antenna and configured to allow the first part and the second part to rotate about a rotation axis defined by the rotational shaft.

In some embodiments, an electronic device includes a connector having an antenna and a first part connected with the connector and having a first display region. The electronic device also includes a second part connected with the connector and having a second display region.

In some embodiments, an electronic device includes an adjustable structure and a display part connected to the adjustable structure and rotate about a rotation axis defined by the adjustable structure. The electronic device also includes a flexible antenna package disposed at the adjustable structure and having an antenna and an electronic component electrically connected to the antenna.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

FIG. 2B illustrates a cross-sectional view of an example of an electronic device according to some embodiments of the present disclosure.

FIG. 6C illustrates a cross-sectional view of an example of a part of an electronic device according to some embodiments of the present disclosure.

DETAILED DESCRIPTION

Figure 1A:
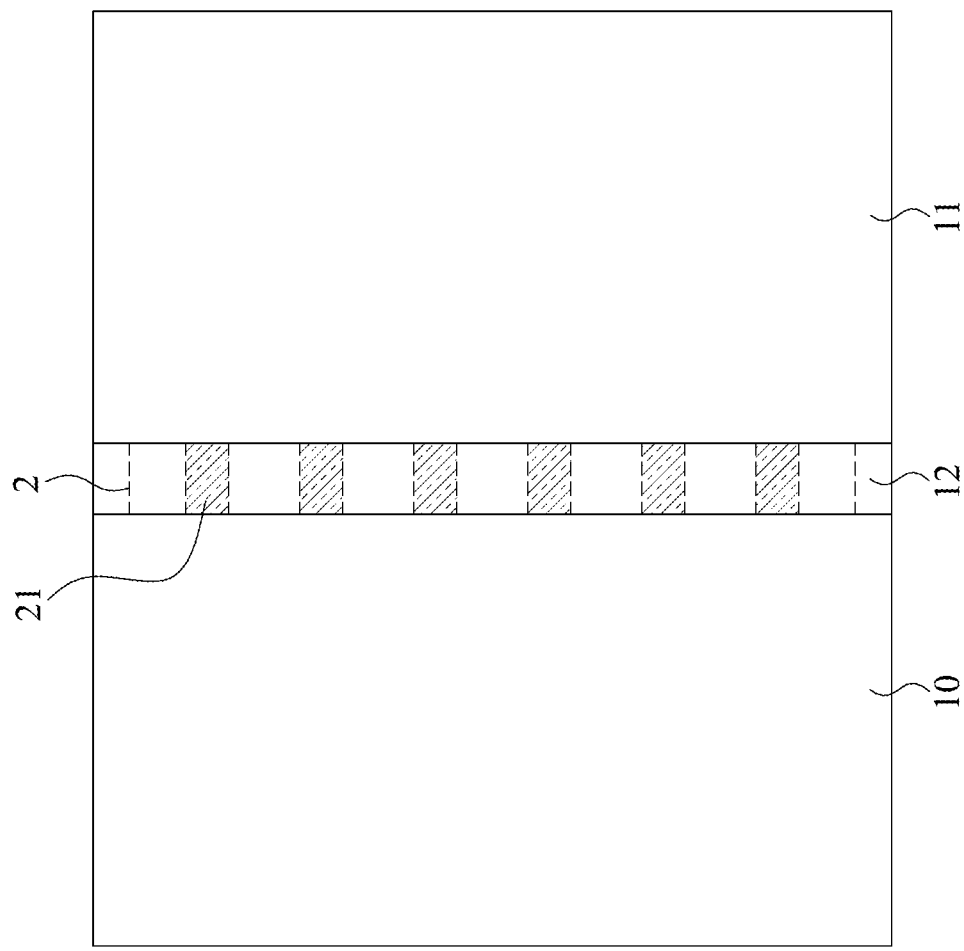
FIG. 1A illustrates a top view of an example of an electronic device according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1A illustrates a top view of an example of an electronic device 1 according to some embodiments of the present disclosure. The electronic device 1 includes parts 10, 11 a connector 12, and an antenna package 2 including one or more antennas 21.

Figure 7:
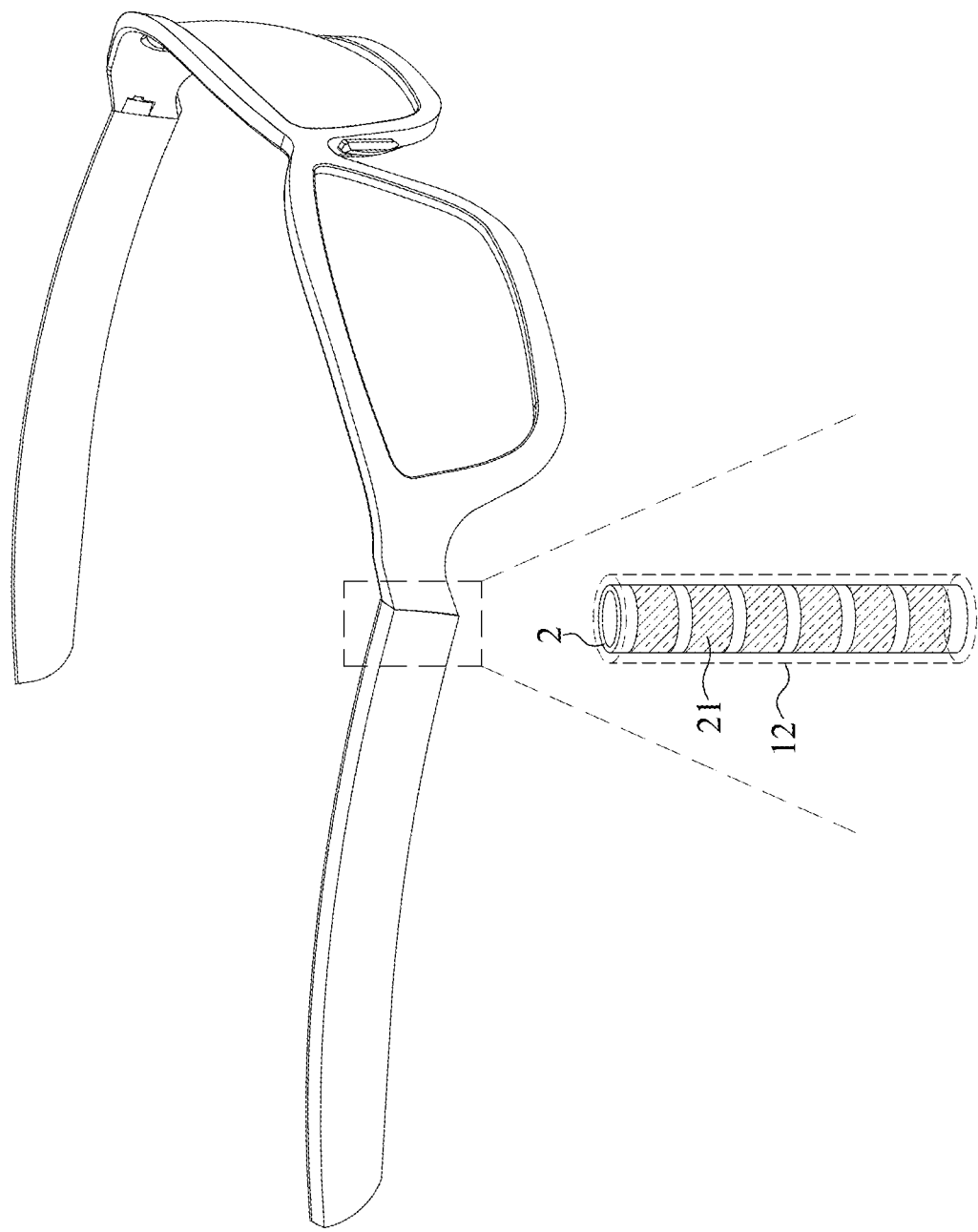
FIG. 7 illustrates a perspective view of an example of a wearable device according to some embodiments of the present disclosure.

The electronic device 1 may be or include a wireless device. In some embodiments, the electronic device 1 may be or include a user equipment (UE) or a personal electronic device such as a cellular phone, a tablet, a notebook, a laptop computer, a personal computer, etc. In some embodiments, the electronic device 1 may be or include a wearable device, such as a smart watch, a smart twist wristband, a pair of glasses (as shown in FIG. 7), etc. In some embodiments, the electronic device 1 may be or include an Internet of Things (IoT) device, an Internet of Everything (IoE) device, or an apparatus implemented in various articles such as appliances, vehicles, meters, etc.

Figure 2A:
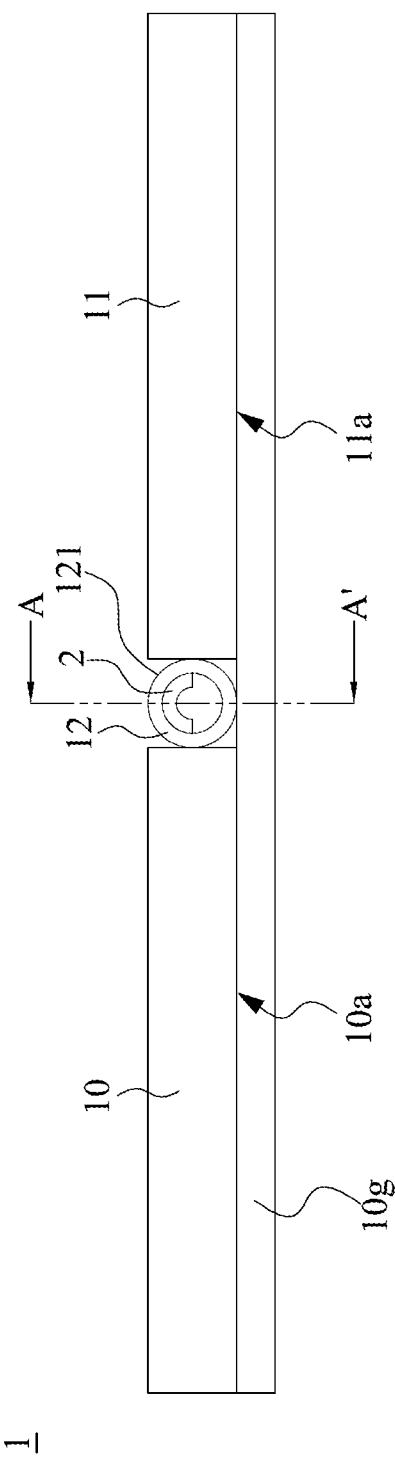
FIG. 2A illustrates a cross-sectional view of an example of an electronic device according to some embodiments of the present disclosure.

The electronic device 1 may be foldable or the configuration of the electronic device 1 may be adjustable. For example, the part 10 and the part 11 may each be connected (such as rotatably connected) with the connector 12. The part 10 may be connected with the part 11 by the connector 12. The part 10 may be adjacent to the part 11. The part 10 and the part 11 may rotate over 180° relative to each other between an unfolded configuration (as shown in FIG. 2A, where the part 10 and the part 11 are unfolded from each other and/or form an obtuse angle with each other) and a folded configuration (as shown in FIG. 2B, where the part 10 and the part 11 are overlapping).

The connector 12 may include a rotational shaft, a hinge, or a joint. The connector 12 may define a rotation axis. The connector 12 may be configured to allow the part 10 and the part 11 to rotate about the rotation axis. In some embodiments, the connector 12 may be an adjustable region (or an adjustable structure) of the electronic device 1 and may be configured to adjust the configuration of the electronic device 1. In contrast, the part 10 and the part 11 may be non-adjustable regions of the electronic device 1.

The shape of the connector 12 may be a hollow cylinder. The connector 12 may be injected using a synthetic resin or be formed of a metal, such as stainless steel (STS), titanium (Ti), aluminum (Al), etc.

The antenna package 2 may be foldable, flexible, bendable, or rollable. For example, the antenna package 2 may be resistant to stress, impact, twisting or other physical or structural changes. The antenna package 2 may be disposed on the connector 12. The antenna package 2 may be embedded in the connector 12. The antenna package 2 may be integrated within the connector 12. In other words, the connector 12 may include the antenna package 2. The antenna package 2 may be spaced apart from the part 10 and the part 11.

In some embodiments, the antenna package 2 may include more than one antenna 21 and may be capable of concurrently transmitting and/or receiving signals. However, in some embodiments, the antenna package 2 may include a single antenna. The antennas 21 may be arranged in a line. The antennas 21 may be arranged in an array. The antennas 21 may be spaced apart from each other, and a phase of a signal applied to each of the antennas 21 may be changed to implement beamforming.

Figure 1B:
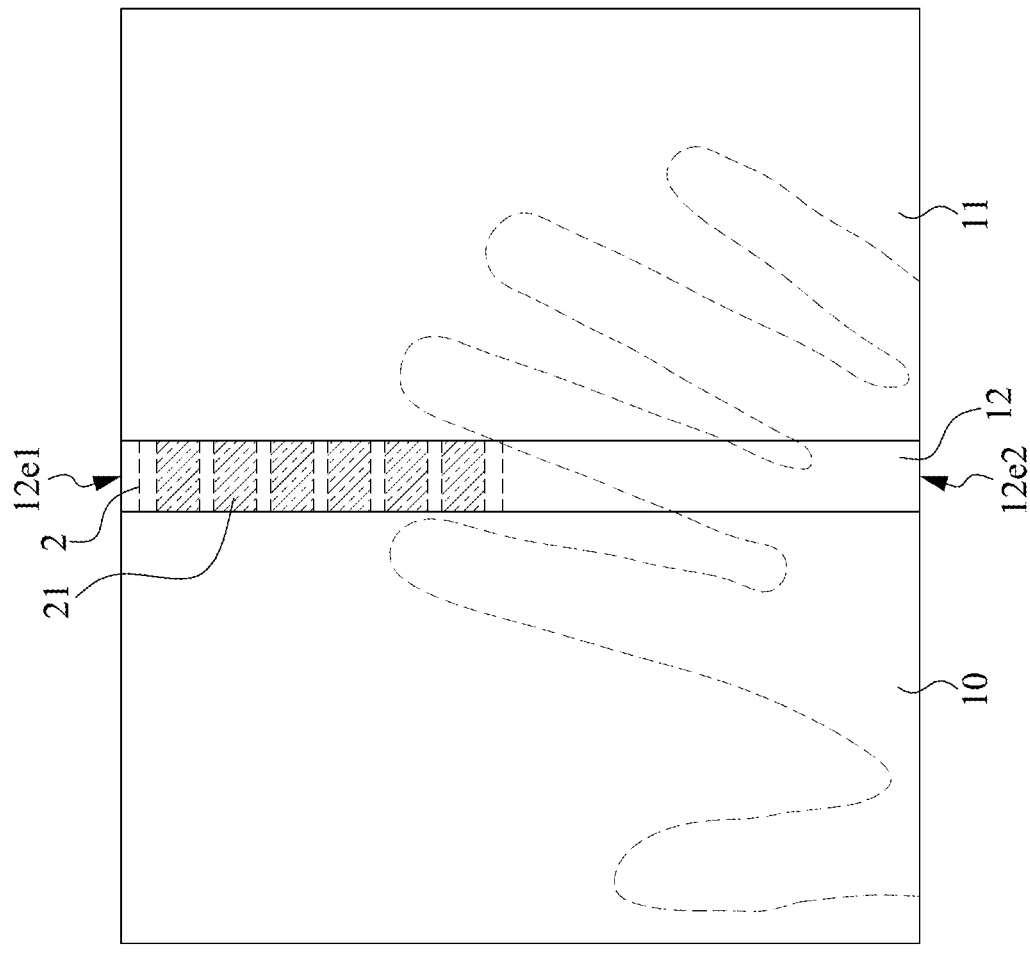
FIG. 1B illustrates a top view of an example of an electronic device according to some embodiments of the present disclosure.

FIG. 1B illustrates a top view of an example of an electronic device 1' according to some embodiments of the present disclosure. The electronic device 1' is similar to the electronic device 1 as shown in FIG. 1A, and the differences therebetween are described below.

The connector 12 may include an end 12e1 and an end 12e2 opposite to the end 12e1. For example, the connector 12 may include longer sides and shorter sides. The part 10 and the part 11 may be connected to the longer sides. The end 12e2 and the end 12e1 may be on the shorter sides.

The antenna package 2 may be disposed proximal to the end 12e1 and distal from the end 12e2. The antenna package 2 may be disposed closer to the end 12e1 than to the end 12e2. The antennas 21 may be disposed proximal to the end 12e1 and distal from the end 12e2. The antennas 21 may be disposed closer to the end 12e1 than to the end 12e2.

According to some embodiments of the present disclosure, by arranging the antennas 21 closer to one end or side of the connector 12, the antennas 21 will not be blocked or covered when the electronic device 1' is held by a hand. Therefore, the antenna performance may be enhanced, and the signal quality may be better.

Figure 2C:
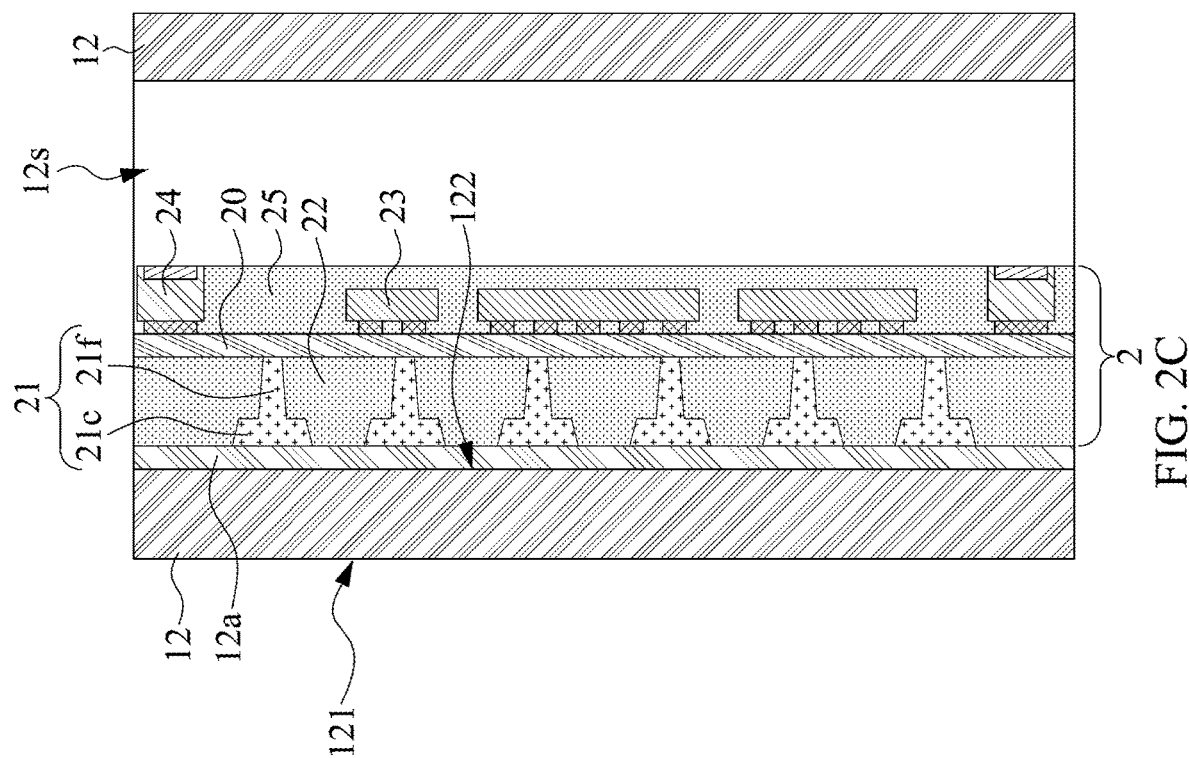
FIG. 2C is a cross-sectional view illustrating the electronic device taken along an A-A' line shown in FIG. 2A according to some embodiments of the present disclosure.

FIG. 2A illustrates a cross-sectional view of an example of the electronic device 1 in an unfolded configuration according to some embodiments of the present disclosure. FIG. 2B illustrates a cross-sectional view of an example of the electronic device 1 in a folded configuration according to some embodiments of the present disclosure. FIG. 2C is a cross-sectional view illustrating the electronic device 1 taken along an A-A' line shown in FIG. 2A according to some embodiments of the present disclosure.

The part 10 and the part 11 may each be or include a display or a display panel that displays an image. The display panel may include a display region or a display area (such as the areas 10a and 11a) in which a plurality of pixels are arranged. The display panel may include an organic light emitting diode display device (OLED), a liquid crystal display device (LCD), a field emission display device (FED), a plasma display device (PDP), or an electrophoretic image display device (EPD), etc.

The part 10 and the part 11 may be physically separated from each other. However, in some other embodiments, the part 10 and the part 11 may be parts of a single display panel. For example, the part 10 and the part 11 may be physically connected. For example, the part 10 and the part 11 may form a continuous display panel.

A window or a cover window 10g may be disposed on the areas 10a and 11a. The window 10g may include a glass, a transparent polyimide, etc.

The shape at an end of the connector 12 from the cross-sectional views of FIGS. 2A and 2B may be an annular ring. The antenna package 2 may be disposed on the inner surface or internal surface of the connector 12. In some embodiments, the inner surface of the connector 12 may be partially covered by the antenna package 2. For example, the antenna package 2 may circumferentially extend along the inner surface of the connector 12.

The connector 12 may have an outer surface 121. The outer surface 121 may include a first region corresponding to the antenna 12 and a second region. A projection on the antenna 12 is corresponding to the first region. A projection on the antenna 12 is spaced apart from the second region. The first region is exposed from the part 10 and the part 11. The second region may be at least partially covered by the part 10 and the part 11.

Referring to FIG. 2C, the antenna package 2 may include a carrier 20, the antenna 21, protection layers 22, 25, an electronic component 23, and an interconnection element 24.

The antenna package 2 may be disposed in a space 12s defined by the connector 12. The space 12s may be defined by an inner surface 122 of the connector 12. The antenna package 2 may be surrounded by the connector 12. The antenna package 2 may be accommodated in the space 12s. The antenna package 2 may be attached to the inner surface 122 (opposite to an outer surface 121) of the connector 12 through an adhesive layer 12a. The antenna package 2 may be surrounded by the inner surface 122 of the connector 12.

In some embodiments, the connector 12 may include conductive pad(s), trace(s), via(s), or other interconnection (s). For example, the connector 12 may include a wall and an interconnection element in the wall. The interconnection element may connected among the antenna 21, the electronic component 23 and the connector 24.

The adhesive layer 12a may include epoxy, resin, or other suitable materials, and may be a paste. For example, the protection layer 22 may be attached to the inner surface 122 of the connector 12 through the adhesive layer 12a. For example, the protection layer 22 has a surface in contact with the adhesive layer 12a and an opposite surface in contact with the carrier 20. For example, the antenna 21 may be attached to the inner surface 122 of the connector 12 through the adhesive layer 12a.

In some embodiments, the carrier 20 (or a supporting element) may be or include, for example, a substrate. In some embodiments, the carrier 20 may be or include, for example, a printed circuit board, such as a paper-based copper foil laminate, a composite copper foil laminate, or a polymer-impregnated glass-fiber-based copper foil laminate. In some embodiments, the carrier 20 may include conductive pad(s), trace(s), via(s), or other interconnection(s). For example, the carrier 20 may include one or more transmission lines (e.g., communications cables) and one or more grounding lines and/or grounding planes. For example, the carrier 20 may include one or more conductive pads in proximity to, adjacent to, or embedded in and exposed at a surface of the carrier 20. The carrier 20 may include a solder resist to fully expose or to expose at least a portion of the conductive pads for electrical connections. In some embodiments, the carrier 20 may be configured to support the antenna 21, the protection layers 22, 25, the electronic component 23, and the interconnection element 24.

The antenna 21 may be disposed between the inner surface 122 of the connector 12 and the carrier 20. The antenna 21 may be in contact with the adhesive layer 12a. In some embodiments, the connector 12 may define an opening (such as the openings 12h in FIG. 6D) exposing at least a part of the antenna 21. For example, the connector 12 may be formed of a metal and may define an opening 12h exposing at least a part of the antenna 21.

In some embodiments, the antenna 21 may include a conductive layer 21c and a feeding element 21f connected between the conductive layer 21c and the carrier 20. The conductive layer 21c may define an antenna pattern, such as an antenna array. For example, the conductive layer 21c may define a patch antenna. The conductive layer 21c may be partially exposed from the protection layer 22. The feeding element 21f may be surrounded or covered by the protection layer 22. In some embodiments, the feeding element 21f may taper from the conductive layer 21c to the carrier 20. A single feeding element 21f may be connected with one antenna pattern of the conductive layer 21c. However, in some other embodiments, a single feeding element 21f may be connected with more than one antenna pattern of the conductive layer 21c.

In some embodiments, the antenna 21 may support fifth generation (5G) communications, such as Sub-6 GHz frequency bands and/or millimeter (mm) wave frequency bands. For example, the antenna 21 may incorporate both Sub-6 GHz antennas and mm wave antennas. In some embodiments, the antenna 21 may support beyond-5G or 6G communications, such as tetrahertz (THz) frequency bands.

In some embodiments, the antenna 21 may include a conductive material such as a metal or metal alloy. Examples of the conductive material include gold (Au), silver (Ag), copper (Cu), platinum (Pt), Palladium (Pd), other metal(s) or alloy(s), or a combination of two or more thereof.

The electronic component 23 may be disposed inside of the inner surface 122 of the connector 12. The electronic component 23 and the antenna 21 may be disposed on opposite sides of the carrier 20. The electronic component 23 may be separated from the antenna 21 by the carrier 20. The antenna 21 may be disposed between the inner surface 122 of the connector 12 and the electronic component 23.

The electronic component 23 may be electrically connected to one or more other electrical components (if any), to the antenna 21, and to the carrier 20 (e.g., to the interconnection(s)), and the electrical connection may be attained by way of flip-chip, wire-bond techniques, metal to metal bonding (such as Cu to Cu bonding), or hybrid bonding. In some embodiments, the electronic component 23 may be electrically connected to one or more other electrical components (if any), to the antenna 21, and to the carrier 20 through coupling.

In some embodiments, the electronic component 23 may be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some embodiments, the electronic component 23 may be integrated circuit (IC) dies, radio frequency ICs (RFICs), power management ICs (PMICs), surface mount devices (SMDs), etc. In some embodiments, the electronic component 23 may include a high-power amplifier (HPA) and a low-noise amplifier (LNA). For example, signals transmitted through the HPA may be radiated through the antenna 21, and reception signals received through the antenna 21 may be amplified through the LNA. In some embodiments, the electronic component 23 may be configured to feed signals to the antenna 21. In some embodiments, the electronic component 23 may include a transceiver.

The interconnection element 24 may be disposed on the carrier 20. The interconnection element 24 and the electronic component 23 may be disposed on the same side of the carrier 20. The interconnection element 24 may be adjacent to the electronic component 23.

In some embodiments, the interconnection element 24 may include a solder ball, a copper (Cu) pillar, a conductive via, a conductive wire, a board-to-board connector, or other types of interconnection elements. In some embodiments, the interconnection element 24 may be partially exposed from the protection layer 25 and electrically connected with a circuit area on the part 10 and/or the part 11 through a conductive wire, a flexible printed circuit (FPC) board, or other feasible connectors. In some embodiments, the interconnection element 24 may communicate with the circuit area on the part 10 and/or the part 11 through a wireless connection. For example, the antenna package 2 may be electrically connected and/or communicate with a circuit area on the part 10 and/or the part 11 through the interconnection element 24.

The protection layer 22 may be disposed on the carrier 20 to cover the antenna 21. As described, the antenna 21 may include a conductive layer 21c partially exposed from the protection layer 22 and a feeding element 21f extending in the protection layer 22. In some embodiments, the protection layer 22 and the antenna 21 may be in the form of a film. For example, the protection layer 22 and the antenna 21 may be an antenna layer.

The protection layer 25 may be disposed on the carrier 20 to cover the electronic component 23. As described, the interconnection element 24 may be partially exposed from the protection layer 25. In some embodiments, the protection layer 25, the electronic component 23, and the connector 24 may be in the form of a film. For example, the protection layer 25, the electronic component 23, and the connector 24 may be a circuit layer.

In some embodiments, the protection layer 22 and the protection layer 25 may each include an encapsulant. In some embodiments, the protection layer 22 and the protection layer 25 may each include an epoxy resin having fillers, a molding compound (e.g., an epoxy molding compound or other molding compound), a polyimide, a phenolic compound or material, a material with a silicone dispersed therein, or a combination thereof. In some embodiments, the protection layer 22 and the protection layer 25 may each be foldable, flexible, bendable, or rollable. In some embodiments, the protection layer 22 and the protection layer 25 may each be resistant to stress, impact, twisting or other physical or structural changes.

In some embodiments, in a top view of FIG. 2A, the electronic component 23 may be closer to the display region or a display area (such as the areas 10a and 11a) than the antenna 21.

To support the industry's demand for increased electronic functionality, the size and/or form factor of the semiconductor device packages will inevitably be increased, and some applications may be limited (e.g., in portable devices). In addition, as the display area (such as the areas 10a and 11a) expands, the space for accommodating the antenna package 2 and other components (such as a battery, a memory, a processor, etc.) decreases.

According to some embodiments of the present disclosure, arranging the antenna package 2 on the connector 12 is space-saving and also increases the antenna performance in comparison with placing the antenna package on the parts 10 and/or 11, where the antennas may be covered by the display areas and the antenna performance may be degraded. For example, the signal strength and/or the signal-to-noise ratio of the antenna package 2 may be increased.

Figure 3A:
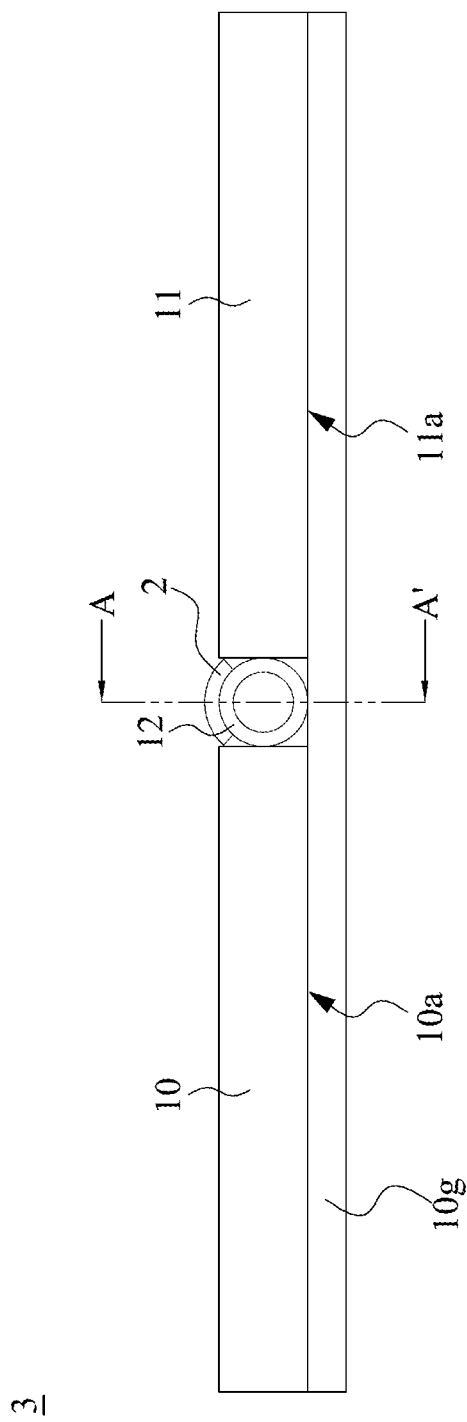
FIG. 3A illustrates a cross-sectional view of an example of an electronic device according to some embodiments of the present disclosure.
Figure 3B:
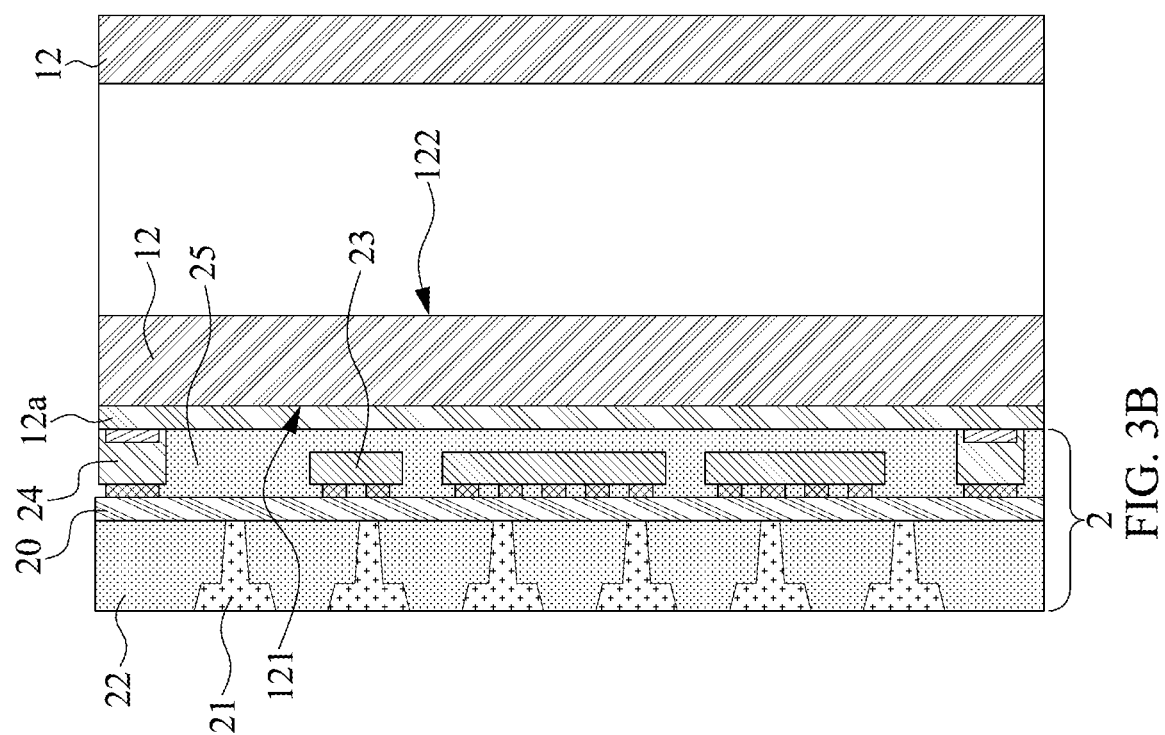
FIG. 3B is a cross-sectional view illustrating the electronic device taken along an A-A' line shown in FIG. 3A according to some embodiments of the present disclosure.

FIG. 3A illustrates a cross-sectional view of an example of an electronic device 3 in an unfolded configuration according to some embodiments of the present disclosure. FIG. 3B is a cross-sectional view illustrating the electronic device 3 taken along an A-A' line shown in FIG. 3A according to some embodiments of the present disclosure. The electronic device 3 is similar to the electronic device 1, and the differences therebetween are described below.

The antenna package 2 may be attached to the outer surface 121 of the connector 12 through the adhesive layer 12a. For example, the protection layer 25 may be attached to the outer surface 121 of the connector 12 through the adhesive layer 12a. For example, the protection layer 25 may have a surface in contact with the adhesive layer 12a and an opposite surface in contact with the carrier 20.

The electronic component 23 may be disposed between the antenna 21 and the outer surface 121 of the connector 12. The interconnection element 24 may be partially exposed from the protection layer 25 and contact the adhesive layer 12a. In some embodiments, a conductive wire, a flexible printed circuit (FPC) board, or other feasible connectors (not shown in the figures) may be connected with the interconnection element 24. The connectors connected with the interconnection element 24 may be at least partially surrounded or covered by the adhesive layer 12a.

According to some embodiments of the present disclosure, by arranging the antennas 21 on the outer surface 121 of the connector 12, the antenna performance may be enhanced, and the signal quality may be better.

Figure 4A:
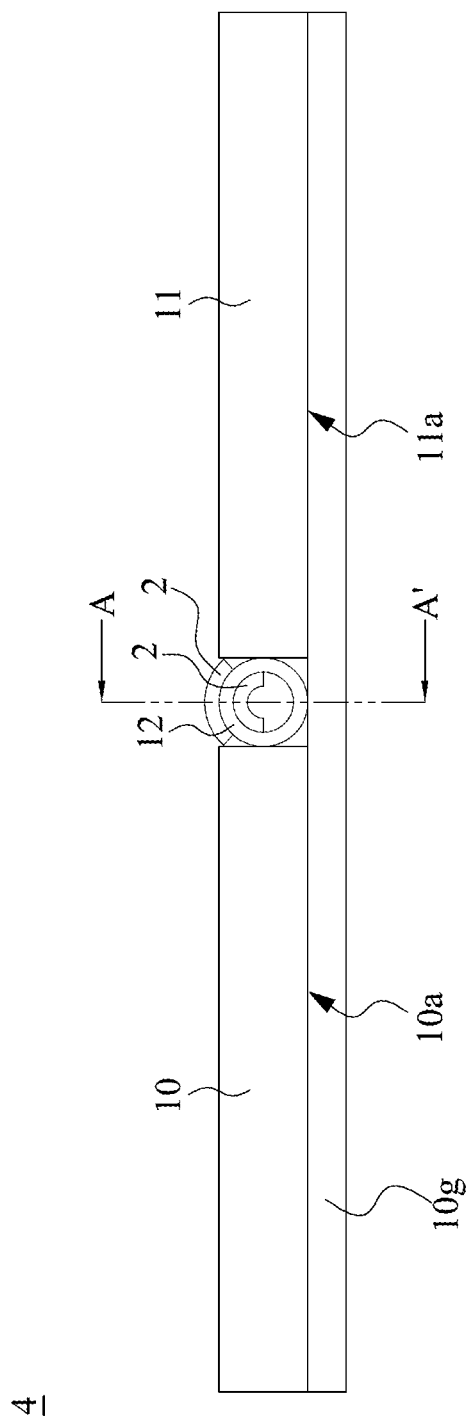
FIG. 4A illustrates a cross-sectional view of an example of an electronic device according to some embodiments of the present disclosure.
Figure 4B:
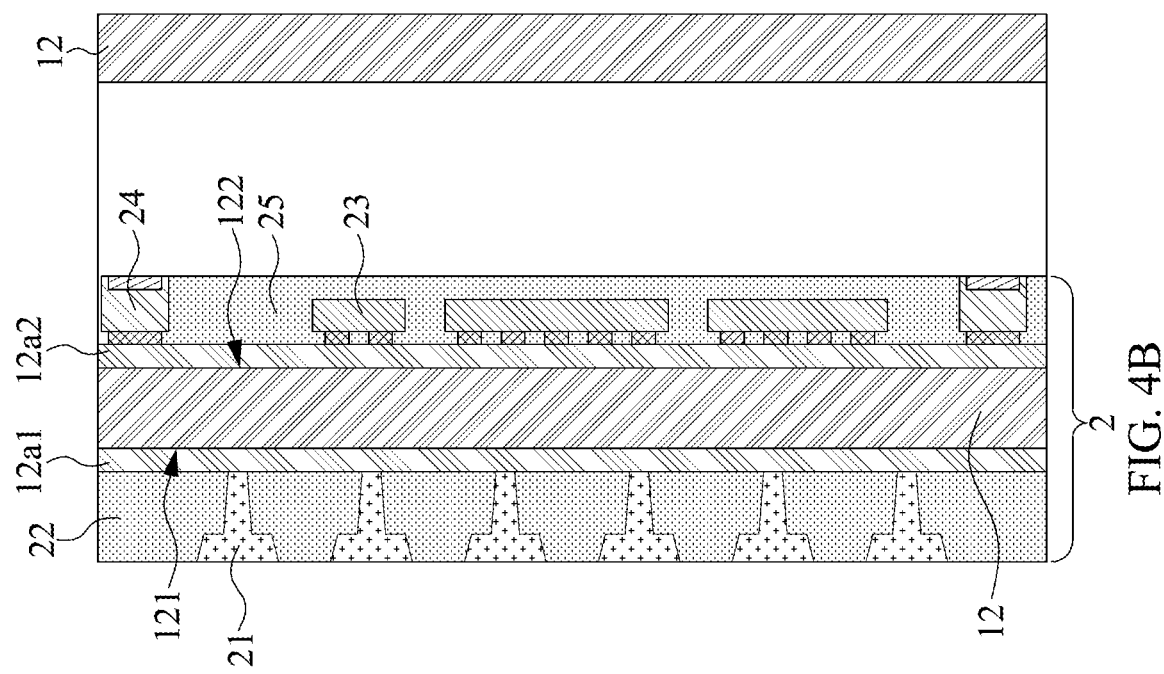
FIG. 4B is a cross-sectional view illustrating the electronic device taken along an A-A' line shown in FIG. 4A according to some embodiments of the present disclosure.

FIG. 4A illustrates a cross-sectional view of an example of an electronic device 4 in an unfolded configuration according to some embodiments of the present disclosure. FIG. 4B is a cross-sectional view illustrating the electronic device 4 taken along an A-A' line shown in FIG. 4A according to some embodiments of the present disclosure. The electronic device 4 is similar to the electronic device 1, and the differences therebetween are described below.

The carrier 20 in FIG. 2C may be omitted. The thickness of the antenna package 2 may be decreased. A part of the connector 12 may be used as the carrier or supporting element for the antenna 21, the electronic component 23, and the connector 24. In some embodiments, the connector 12 may include conductive pad(s), trace(s), via(s), or other interconnection(s). For example, the connector 12 may include a wall and an interconnection element in the wall. The interconnection element may connected among the antenna 21, the electronic component 23 and the connector 24.

The protection layer 22 and the antenna 21 may be an antenna layer and may be attached to the outer surface 121 of the connector 12 through an adhesive layer 12a1.

The protection layer 25, the electronic component 23, and the connector 24 may be a circuit layer and may be attached to the inner surface 122 of the connector 12 through an adhesive layer 12a2. In other words, the antenna 21 and the electronic component 23 may be disposed on opposite sides of the connector 12.

The connector 12 may be disposed between the antenna 21 and the electronic component 23. The connector 12 may separate the antenna 21 from the electronic component 23.

Figure 5:
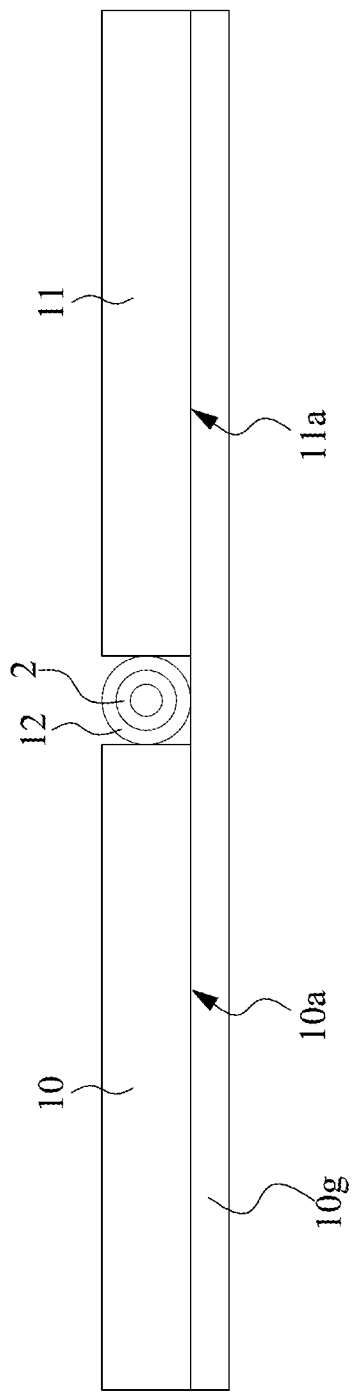
FIG. 5 illustrates a cross-sectional view of an example of an electronic device according to some embodiments of the present disclosure.

FIG. 5 illustrates a cross-sectional view of an example of an electronic device 5 in an unfolded configuration according to some embodiments of the present disclosure. The electronic device 5 of FIG. 5 is similar to the electronic device 1 as shown in FIG. 2A, and the differences therebetween are described below.

In some embodiments, the inner surface of the connector 12 may be entirely covered by the antenna package 2. For example, the antenna package 2 may entirely circumferentially extend along the inner surface of the connector 12.

Figure 6A:
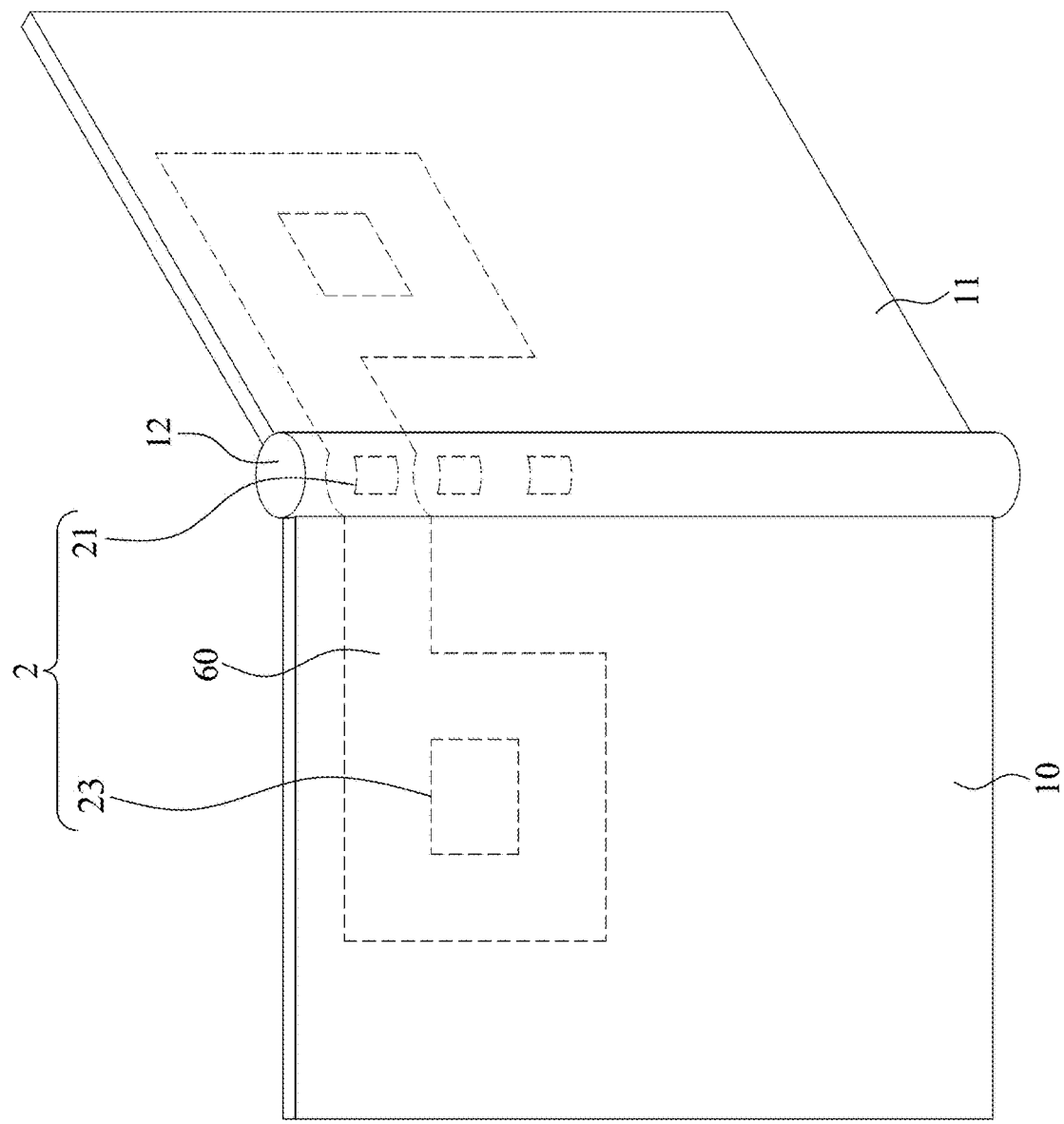
FIG. 6A illustrates a perspective view of an example of an electronic device according to some embodiments of the present disclosure.

FIG. 6A illustrates a perspective view of an example of an electronic device 6 according to some embodiments of the present disclosure.

The antenna package 2 of the electronic device 6 may have a carrier 60. The antenna 21 and the electronic component 23 may be disposed on or supported by the carrier 60. The electronic component 23 may be arranged in a circuit area on the part 10 and/or the part 11. For example, a voltage supply or a battery may be disposed in the circuit area on the part 10 and/or the part 11.

The carrier 60 may similar to the carrier 20 in FIG. 2C. The carrier 60 may include an FPC board, or other feasible connectors. The carrier 60 may extend from the connector 12 to the part 10 and/or the part 11 of the electronic device 6.

The antenna 21 may be disposed on the inner surface of the connector 12. The electronic component 23 may be electrically connected with the antenna 21 through the carrier 60 and the connector 12. For example, the connector 12 may include conductive pad(s), trace(s), via(s), or other interconnection(s).

Figure 6B:
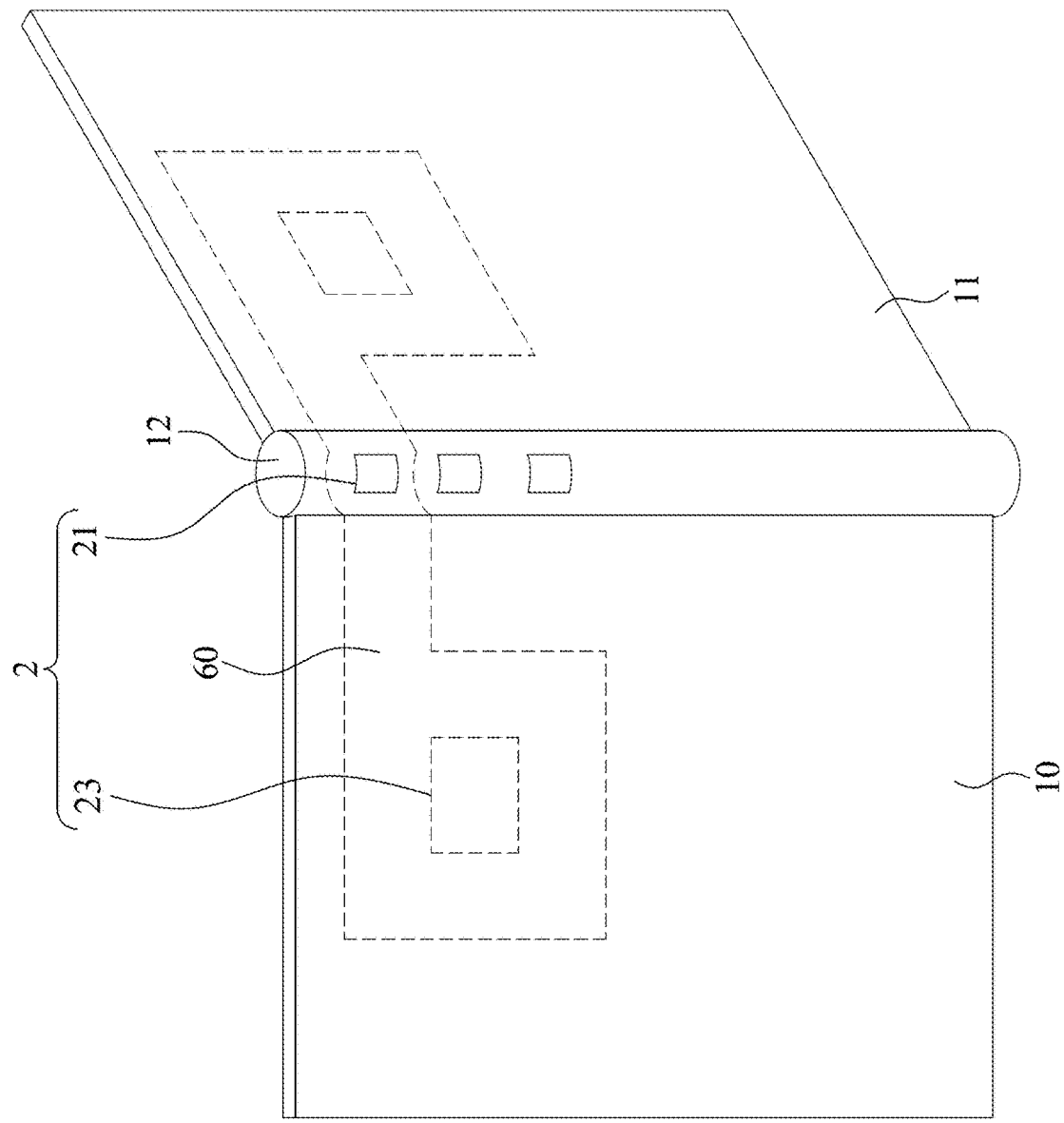
FIG. 6B illustrates a perspective view of an example of an electronic device according to some embodiments of the present disclosure.

FIG. 6B illustrates a perspective view of an example of an electronic device 6' according to some embodiments of the present disclosure. FIG. 6B is similar to FIG. 6A, except that the antenna 21 is disposed on the outer surface of the connector 12.

FIG. 6C illustrates a cross-sectional view of an example of a part of an electronic device (such as the electronic device 6 or the electronic device 6') according to some embodiments of the present disclosure. FIG. 6C is similar to FIG. 2C, and the differences therebetween are described below.

The electronic component 23 in FIG. 6C may not be present in the antenna package 2. For example, the electronic component 23 in FIG. 6C may be arranged in a circuit area on the part 10 and/or the part 11 (as shown in FIG. 6A). The thickness of the antenna package 2 may be decreased. The carrier 20 may extend from the connector 12 to the part 10 and/or the part 11 (similar to the electronic device 6 or the electronic device 6').

The interconnection element 24 may be disposed between the carrier 20 and the inner surface 122 of the connector 12. The interconnection element 24 and the antenna 21 may be disposed on the same side of the carrier 20. The interconnection element 24 may be adjacent to the antenna 21.

Figure 6D:
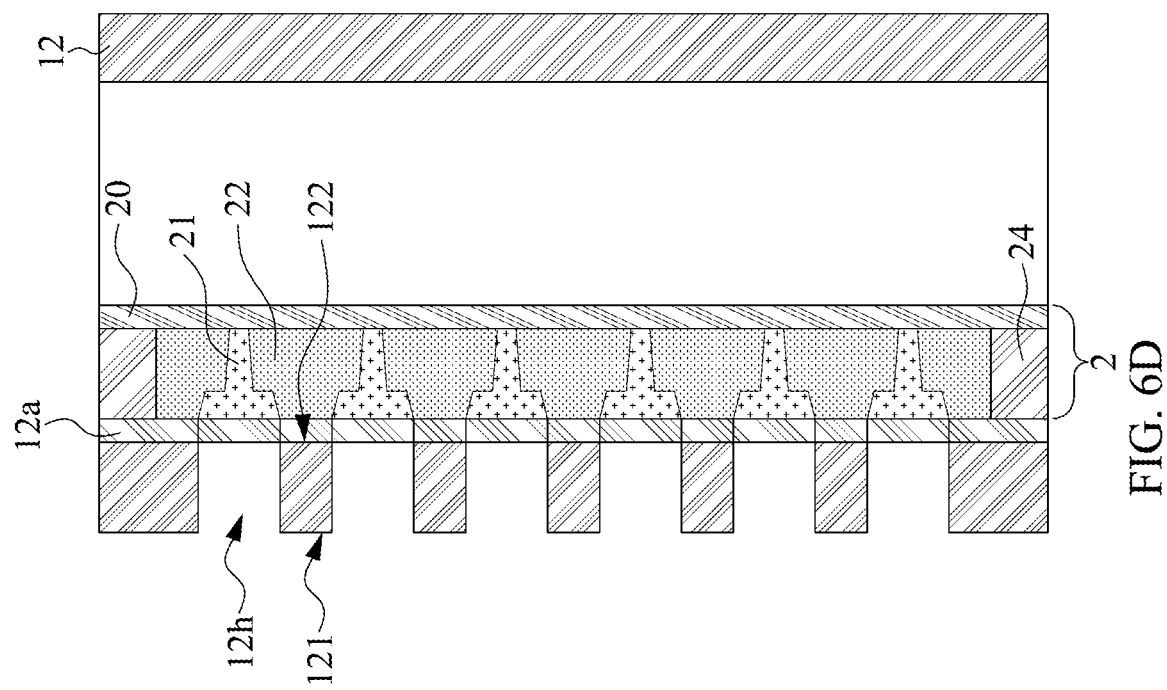
FIG. 6D illustrates a cross-sectional view of an example of a part of an electronic device according to some embodiments of the present disclosure.

FIG. 6D illustrates a cross-sectional view of an example of a part of an electronic device (such as the electronic device 6 or the electronic device 6') according to some embodiments of the present disclosure. FIG. 6D is similar to FIG. 6C, and the differences therebetween are described below.

In some embodiments, the connector 12 may define one or more openings 12h. The openings 12h may each be corresponding to an antenna pattern. For example, the openings 12h may each expose at least a part of the antenna 21 (such as the conductive layer 21c in FIG. 2C).

In some embodiments, the connectors 12 shown in FIGS. 2C, 3B, and 4B may include one or more openings exposing at least a part of the antenna 21.

FIG. 7 illustrates a perspective view of an example of a wearable device 7 according to some embodiments of the present disclosure.

Examples of the wearable device 7 include a pair of glasses, a pair of smart glasses, and so on. While the wearable device 7 is shown as a pair of glasses in FIG. 7, the present disclosure is not limited thereto. For example, the wearable device 7 may be any wearable device including a rotational shaft, a hinge, or a joint.

The wearable device 7 may have the connector 12 as shown in FIGS. 2C, 3B, and 4B, 6C and 6D. The temples of the wearable device 7 may be connected (such as rotatably connected) with the connector 12. In some embodiments, the connector 12 may be an adjustable region of the wearable device 7 and may be configured to adjust the configuration of the wearable device 7.

Similarly, the antenna package 2 may be foldable, flexible, bendable, or rollable. For example, the antenna package 2 may be resistant to stress, impact, twisting or other physical or structural changes. The antenna package 2 may be disposed on the connector 12. The antenna package 2 may be embedded in the connector 12. The antenna package 2 may be integrated within the connector 12. In other words, the connector 12 may include the antenna package 2. The detailed descriptions of the antenna package 2 may refer to the paragraphs with respect to FIGS. 2C, 3B, and 4B, 6C and 6D, and are not repeated hereinafter for conciseness.

FIGS. 8A, 8B, 8C, 8D, and 8E illustrate cross-sectional views in one or more stages of a method of manufacturing a part of an electronic device in accordance with an embodiment of the present disclosure. At least some of these figures have been simplified to better understand the aspects of the present disclosure. In some embodiments, the antenna package 2 of FIGS. 2C and 3B may be manufactured through the operations described with respect to FIGS. 8A, 8B, 8C, 8D, and 8E.

Figure 8A:
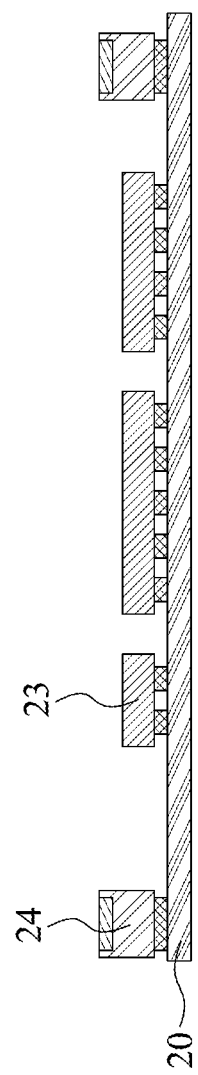
FIGS. 8A, 8B, 8C, 8D, and 8E illustrate cross-sectional views in one or more stages of a method of manufacturing a part of an electronic device in accordance with an embodiment of the present disclosure.

Referring to FIG. 8A, the carrier 20 is provided. The electronic component 23 and the interconnection element 24 may be disposed on the carrier 20.

Figure 8B:
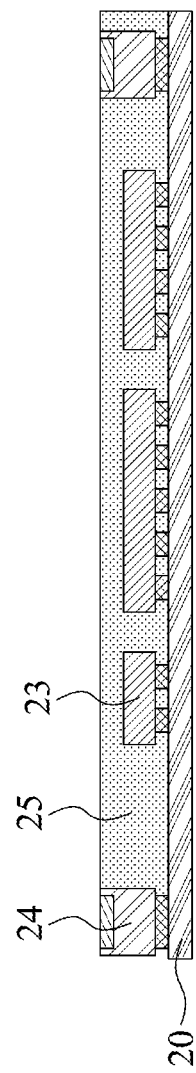

Referring to FIG. 8B, the protection layer 25 may be formed on the carrier 20 to cover or encapsulate the electronic component 23 and the interconnection element 24. In some embodiments, the protection layer 25 may be formed by a molding technique, such as transfer molding or compression molding.

Figure 8C:
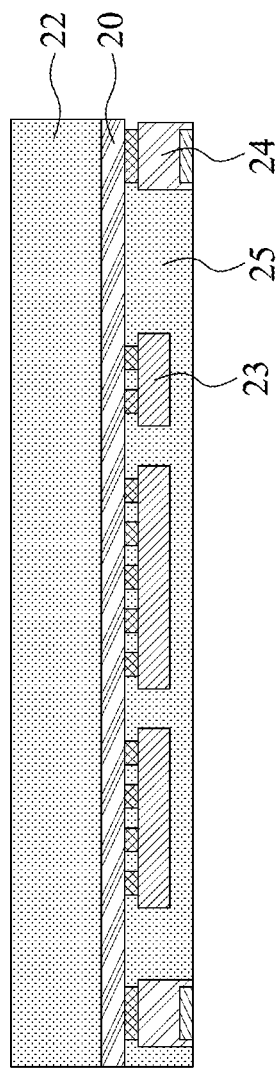

Referring to FIG. 8C, the protection layer 22 may be formed on an opposite side of the carrier 20 with respect to the protection layer 25.

Figure 8D:
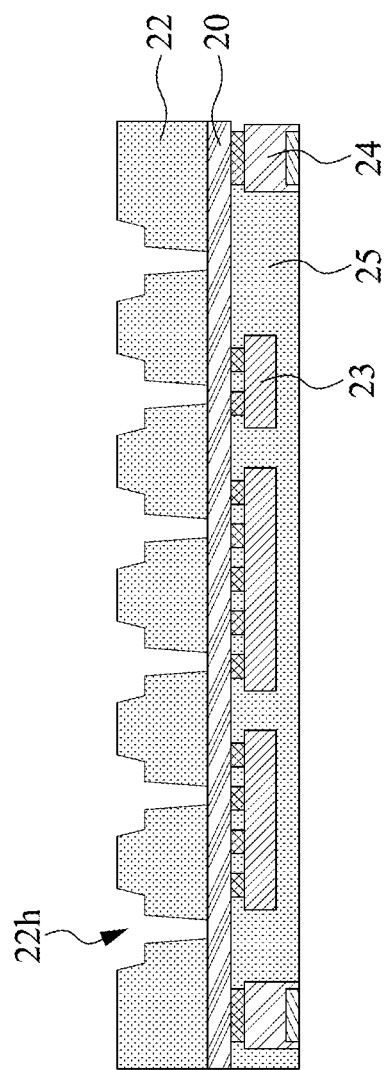

Referring to FIG. 8D, a part of the protection layer 22 may be removed to form one or more holes or openings 22h exposing the carrier 20. In some embodiments, the hole 22h may have an upper portion and a lower portion of different slopes. The upper portion may be wider than the lower portion. The upper portion may taper toward the lower portion. The lower portion may taper toward the carrier 20. In some embodiments, the hole 22h may be formed by a laser drilling operation.

Figure 8E:
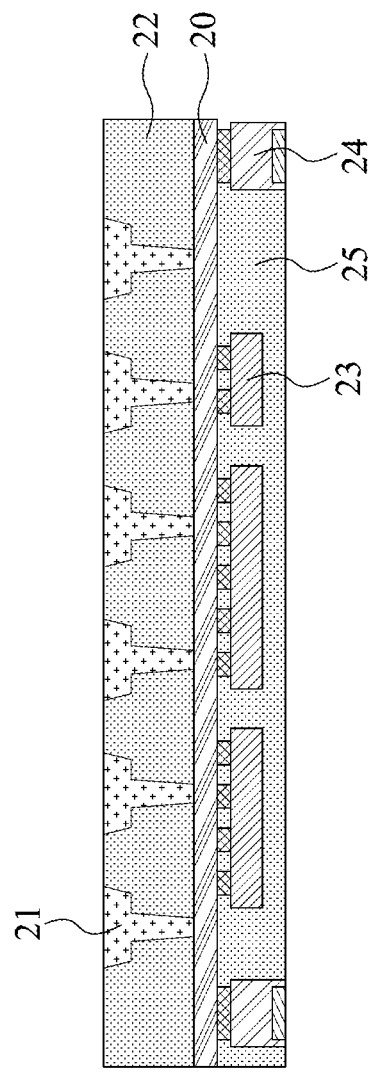

Referring to FIG. 8E, a conductive material may be disposed in the hole 22h of the protection layer 22 to form the antenna 21. In some embodiments, the conductive material may be disposed through, for example, a physical vapor deposition (PVD), such as sputtering or spray coating. In some embodiments, the conductive material may be disposed through a chemical vapor deposition (CVD) or plating.

FIGS. 9A, 9B, 9C, and 9D illustrate cross-sectional views in one or more stages of a method of manufacturing a part of an electronic device in accordance with an embodiment of the present disclosure. At least some of these figures have been simplified to better understand the aspects of the present disclosure. In some embodiments, the antenna package 2 of FIGS. 6C and 6D may be manufactured through the operations described with respect to FIGS. 9A, 9B, 9C, and 9D.

Figure 9A:
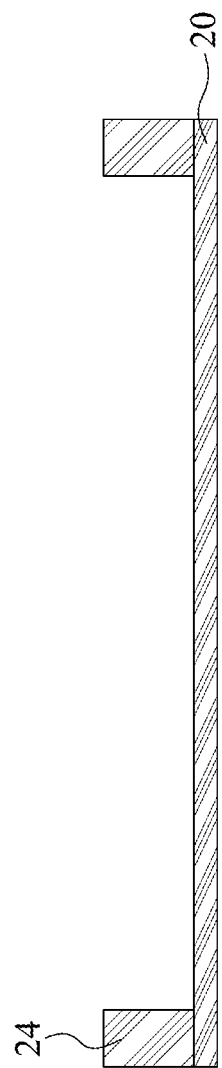
FIGS. 9A, 9B, 9C, and 9D illustrate cross-sectional views in one or more stages of a method of manufacturing a part of an electronic device in accordance with an embodiment of the present disclosure.

Referring to FIG. 9A, the carrier 20 is provided. The interconnection element 24 may be disposed on the carrier 20.

Figure 9B:
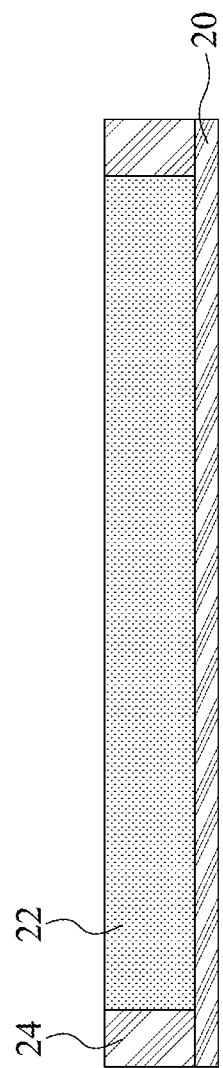

Referring to FIG. 9B, the protection layer 22 may be formed on the carrier 20 to cover or encapsulate the interconnection element 24. In some embodiments, the protection layer 22 may be formed by a molding technique, such as transfer molding or compression molding.

Figure 9C:
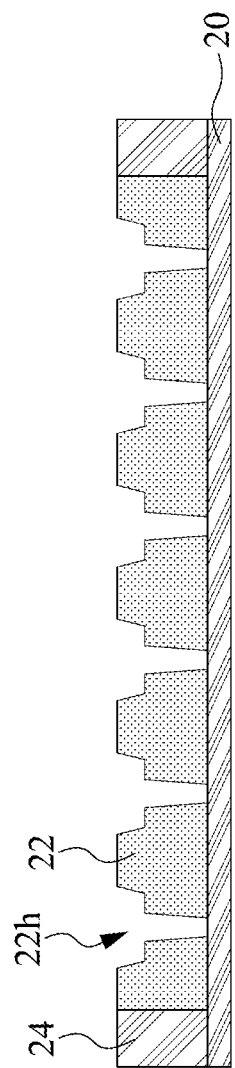

Referring to FIG. 9C, a part of the protection layer 22 may be removed to form one or more holes or openings 22h exposing the carrier 20. In some embodiments, the hole 22h may have an upper portion and a lower portion of different slopes. The upper portion may be wider than the lower portion. The upper portion may taper toward the lower portion. The lower portion may taper toward the carrier 20. In some embodiments, the hole 22h may be formed by a laser drilling operation.

Figure 9D:
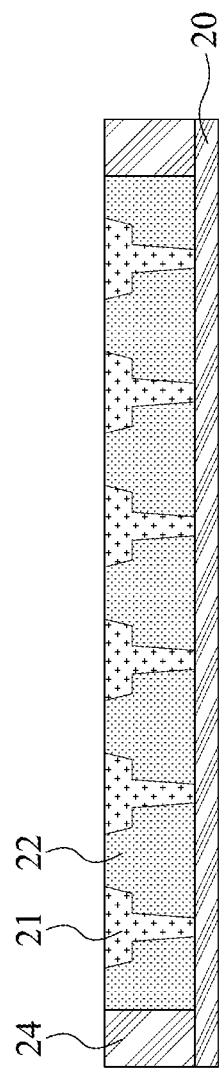

Referring to FIG. 9D, a conductive material may be disposed in the hole 22h of the protection layer 22 to form the antenna 21. In some embodiments, the conductive material may be disposed through, for example, a PVD, such as sputtering or spray coating. In some embodiments, the conductive material may be disposed through a CVD or plating.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 104 S/m, such as at least 105 S/m or at least 106 S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:
    a first part;
    a second part adjacent to the first part; and
    a rotational shaft configured to allow the first part and the second part to rotate about a rotation axis defined by the rotational shaft; and
    an antenna package attached to an inner surface of the rotational shaft through an adhesive layer, wherein the antenna package includes a first electronic component, wherein the inner surface of the rotational shaft defines a space accommodating the first electronic component, and wherein the first electronic component includes a high-power amplifier (HPA) and a low-noise amplifier (LNA).

2. The electronic device of claim 1, wherein the rotational shaft comprises opposite ends and a wall extending between the opposite ends, wherein the wall defines an opening at least partially exposing an antenna of the antenna package.

3. The electronic device of claim 1, wherein the antenna package further comprises:
    a carrier, wherein the first electronic component is electrically connected to an antenna through the carrier; and
    a protection layer disposed over the carrier and covering the first electronic component, wherein the protection layer is spaced apart from the inner surface of the rotational shaft.

4. The electronic device of claim 1, wherein the antenna package further comprises:
    a carrier extending from the rotational shaft to the first part;
    an antenna disposed in the rotational shaft; and
    a second electronic component arranged in a circuit area on the first part.

5. The electronic device of claim 4, wherein the antenna is electrically connected to the second electronic component through the carrier and the rotational shaft.

6. The electronic device of claim 1, wherein the antenna package circumferentially extends along the inner surface of the rotational shaft.

7. The electronic device of claim 6, wherein the antenna package entirely circumferentially extends along the inner surface of the rotational shaft.

8. The electronic device of claim 1, wherein the antenna package further comprises:
   an antenna array contacting the adhesive layer.

9. An electronic device, comprising:
   a first part;
   a second part adjacent to the first part; and
   a rotational shaft configured to allow the first part and the second part to rotate about a rotation axis defined by the rotational shaft; and
   an antenna package attached to an outer surface of the rotational shaft through an adhesive layer, wherein the antenna package includes:
   a carrier;
   an electronic component disposed over the carrier;
   a first protection layer disposed over the carrier and covering the electronic component, wherein the first protection layer contacts the adhesive layer;
   an antenna array disposed over the carrier; and
   a second protection layer disposed over the carrier and at least partially exposing the antenna array.

10. The electronic device of claim 9, wherein the antenna package comprises:
    feeding elements connecting to the antenna array and tapering toward the adhesive layer.

11. An electronic device, comprising:
    a first part;
    a second part adjacent to the first part; and
    a rotational shaft configured to allow the first part and the second part to rotate about a rotation axis defined by the rotational shaft; and
    an antenna package attached to an inner surface of the rotational shaft through an adhesive layer, wherein the antenna package includes:
    an antenna array contacting the adhesive layer; and
    feeding elements connecting to the antenna array and tapering away from the adhesive layer.

* * * * *